Patented May 6, 1930

1,757,454

UNITED STATES PATENT OFFICE

OTTO EISENHUT, OF HEIDELBERG, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

VALUABLE PRODUCTS FROM COAL, TARS, MINERAL OILS, AND THE LIKE

No Drawing. Application filed January 18, 1927, Serial No. 161,968, and in Germany January 19, 1926.

I have found that valuable unsaturated hydrocarbons containing or consisting of acetylene may be obtained by subjecting varieties of coal, tars, mineral oils and the like, in a state of fine division or vapor to the action of an electric arc, the initial materials being distributed in an atomized state in a suspension agent, by which is understood, according to the present invention, a gas such as hydrogen, nitrogen, carbon dioxide or the like, or water vapor.

If water vapor is employed as the suspension agent, or as a constituent thereof, it must be employed in an amount not sufficient to lead to the production of water gas alone, but only about one-half, or one-third, or even less, of the quantity needed for the production of water gas as otherwise acetylene is not formed.

The products to be treated as aforesaid may be introduced into the reaction chamber either along with the water vapor or gas to be admitted, or alone, for example, by means of nozzles or through a passage in one of the electrodes the amount required for the reaction being vaporized during the discharge. If coal be used, it may be introduced into the reaction chamber in the form of fine dust, or mixed with tar or oil, and brought into reaction with water vapor.

Particularly good results may be obtained in accordance with the present invention when the original materials are admitted into the electric arc in a heated condition and preheating of the initial materials is necessary when no water vapor is present. This may be effected, for example, by preheating hydrogen and intimately mixing it with tar, for example, in a finely divided or vaporized condition, prior to its admission into the electric arc, so that the mixture reaches the arc in a heated state.

When preheating, however, it is advisable to avoid temperatures at which decomposition of the materials under treatment would be liable to occur, because otherwise, deposition of carbon may take place.

The following examples will further illustrate how the said invention may be carried into practical effect but the invention is not limited to these examples.

Example 1

Hard coal dust with 6 per cent of tar-forming constituents is passed through an electric arc in association with gases of combustion containing water vapor, the relative proportions being such that the mixture contains 200 to 300 grammes of water vapor to about 1 kilogram of coal. In this way about 50 litres of acetylene are obtained from 1 kilogram of coal dust. The consumption of electric current is about 1 kilowatt-hour per 40 litres of acetylene.

Example 2

A mixture of coal tar and hydrogen, preheated to a temperature of 350° C., is passed through an electric arc. The composition of the product expressed as a percentage of the weight of the tar, is: acetylene, 25 to 30 per cent; benzine 5 per cent; lubricating oils, 5 per cent and hydrogen and heavy hydrocarbons 5 to 10 per cent. The unaltered tar can be passed through the arc again.

I claim:

1. A process for the production of acetylene from coal, tars or oils, which comprises distributing the said initial material in a suspension agent comprising water vapor present only in an amount not sufficient to lead to the production of water gas alone, and exposing the mixture to the action of an electric arc.

2. A process for the production of acetylene from coal, tars or oils, which comprises distributing the said initial materials in a suspension agent comprising water vapor present only in an amount smaller than about one half of that required for the production of water gas alone, and exposing the mixture to the action of an electric arc.

3. A process for the production of acetylene from coal, tars or oils, which comprises distributing the said initial materials in a suspension agent consisting of water vapor present only in an amount smaller than about one half of that required for the production of water gas alone, and exposing the mixture to the action of an electric arc.

4. A process for the production of acetylene from coal, tars or oils, which comprises distributing the said initial materials in a suspension agent comprising water vapor present only in an amount not sufficient to lead to the production of water gas alone, and exposing the mixture to the action of an electric arc in a preheated condition.

5. A process for the production of acetylene from coal, tars or oils, which comprises distributing the said initial materials in a suspension agent comprising water vapor present only in an amount smaller than about one half of that required for the production of water gas alone, and exposing the mixture to the action of an electric arc in a preheated condition.

6. A process for the production of acetylene from coal, tars or oils, which comprises distributing the said initial materials in a suspension agent consisting of water vapor present only in an amount smaller than about one half of that required for the production of water gas alone, and exposing the mixture to the action of an electric arc in a preheated condition.

7. A process for the production of acetylene from tars or oils, which comprises distributing the said initial materials in a suspension agent and exposing the mixture in a preheated condition to the action of an electric arc.

In testimony whereof I have hereunto set my hand.

OTTO EISENHUT.